UNITED STATES PATENT OFFICE.

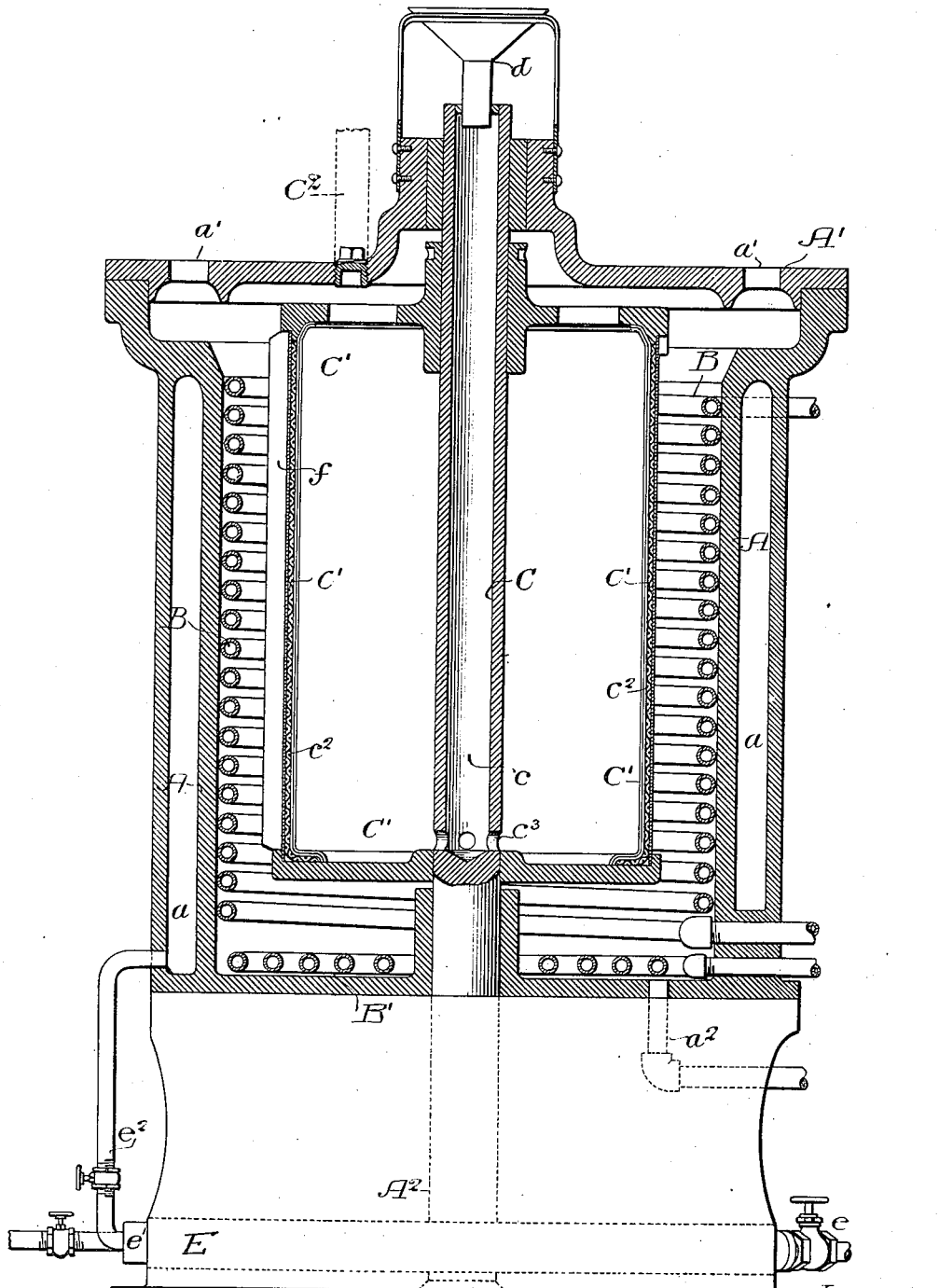

JOHN W. PITTOCK, OF PHILADELPHIA, PENNSYLVANIA, ASSIGNOR TO THE OIL AND WASTE SAVING MACHINE COMPANY, OF PHILADELPHIA, PENNSYLVANIA, A CORPORATION OF PENNSYLVANIA.

PROCESS OF SEPARATING WATER FROM OIL.

No. 928,280.              Specification of Letters Patent.          Patented July 20, 1909.

Application filed August 27, 1908. Serial No. 450,429.

*To all whom it may concern:*

Be it known that I, JOHN W. PITTOCK, a citizen of the United States, residing in Philadelphia, Pennsylvania, have invented certain Improvements in Processes of Separating Water from Oil, of which the following is a specification.

The object of my invention is to improve the process by which water is separated from oil, and particularly lubricating oil. This object I attain in the following manner, reference being had to the accompanying drawing, the figure of which is a vertical sectional view of a separator arranged to carry out my improved process.

Oil used as a lubricator in many cases, where moisture and water exist, such for instance as in a turbine engine, after being used becomes so intimately mixed with water that it is very difficult to separate the water from the oil. By my improved process, however, I can quickly and economically separate the water from the oil and at the same time filter the oil so as to remove any foreign matter.

In carrying out my process I may use such a device as illustrated in the drawing, in which—

A is the casing having a steam jacket $a$ in the present instance, and within the casing is arranged a steam coil B. Both the coil and the jacket are connected to a source of steam supply and in the bottom of the casing I preferably arrange a steam coil B' also connected to a source of steam supply. The casing is provided with a cover plate A' which has a series of perforations $a'$ therein for the escape of vapor. Mounted within the casing is a central vertical shaft C driven, in the present instance, by a turbine motor E mounted in the base $A^2$ of the casing. This motor has an inlet nozzle $e$ and an exhaust pipe $e'$, and this exhaust pipe in the present instance is connected through a pipe $e^2$ to the jacket $a$ of the casing A. In the apparatus shown in the drawing the shaft C is hollow, so as to provide a passage $c$ for the introduction of the oil into the apparatus. Mounted on the shaft is a basket C' having a closed bottom and open at the top. The side walls $c'$ of this basket are perforated and on the inner surface of the walls is a filter medium $c^2$, either of filter paper, cloth, or other material as desired, and this filtering medium may be of any thickness, depending upon the conditions of the oil to be filtered and separated. The inlet passage $c$ in the shaft C connects with the bottom of the basket through passages $c^3$ and a funnel $d$ may be introduced into the top of the hollow shaft if desired. This construction is preferable in small machines, but in large machines the hollow shaft may be dispensed with and a plain solid shaft used, in this event the oil will be fed into the basket through a pipe $C^2$, shown by dotted lines in the drawing. On the exterior of the basket are vanes or blades $f$, so arranged as to circulate the air within the chamber between the casing and the basket. The water as it is vaporized passes away from the apparatus through the openings $a'$, while the oil flows by gravity to the bottom of the chamber and passes from the apparatus through the outlet pipe $a^2$.

While I have shown a steam turbine E for driving the basket C', other means may be provided if found desirable.

The process is carried out in the following manner:—The basket is driven at any speed desired and steam is introduced into the coils B, B' and the jacket $a$ of the casing. In the apparatus illustrated in the drawing, the oil, intimately mixed with water, is introduced through the hollow shaft C enters the bottom of the basket and is immediately forced against the filtering surface $c^2$ and travels up this filtering surface, the oil and water passing through the filtering material while the foreign particles are held. The oil and water are forced by centrifugal action against the steam coils B and against the inner face of the jacketed casing A, the temperature of the pipes and casing being such that the water will be vaporized and the oil will flow by gravity to the bottom of the casing, where it is carried off through the pipe $a^2$. The air in circulation between the basket and the casing will aid in drying and vaporizing the water which will rise in the form of vapor and pass out through the openings $a'$ in the covering A'.

In some forms of apparatus the coils need not be necessary and in others steam jackets may not be necessary, the main idea being to provide a heated surface against which the oil intimately mixed with water is thrown by centrifugal action.

In separating clear oil from water it may not be necessary to use the filtering medium.

I claim:—

1. The process herein described of separating lubricating oil from water, said process consisting in forcibly projecting the intimately mixed oil and water against a surface heated to a temperature sufficient to evaporate the water but insufficient to decompose the oil, whereby the water is vaporized and the oil remains in a liquid state.

2. The process herein described of separating lubricating oil from water, said process consisting in projecting the intimately mixed oil and water by centrifugal force against a surface heated to a temperature sufficient to evaporate the water without decomposing the oil, whereby the water is vaporized and the oil remains in the liquid state.

3. The process herein described of separating lubricating oil from water, said process consisting in finely dividing the intimate mixture of oil and water, and then forcibly projecting the finely divided particles against a surface heated to a temperature sufficient to evaporate the water without affecting the oil, whereby water is vaporized and the oil remains in its liquid state.

4. The process herein described of separating lubricating oil from water, said process consisting in forcibly projecting the mixture in the presence of air in circulation, against a surface heated to a temperature sufficient to vaporize the water without decomposing the oil, the air and the heated surface causing the vaporization of the water while leaving the oil in its liquid state.

5. The process herein described of separating lubricating oil from water, said process consisting in first filtering the mixture to remove the dirt or other foreign matter therefrom by centrifugal force and forcibly projecting said mixture, after being filtered, against a heated surface in the presence of a current of air, the temperature of said surface being sufficiently high to vaporize the water without decomposing the oil.

In testimony whereof, I have signed my name to this specification, in the presence of two subscribing witnesses.

JOHN W. PITTOCK.

Witnesses:
  WALTER CHISM,
  WM. A. BARR.